United States Patent
Herman et al.

(10) Patent No.: US 9,313,951 B2
(45) Date of Patent: Apr. 19, 2016

(54) OPTICAL IMAGE CAPTURE FOR CONTROLLING A POSITION OF A HARVESTER TRANSFER DEVICE

(71) Applicants: Deere & Company, Moline, IL (US); Carnegie Mellon University, a Pennsylvania Non-Profit Corporation, Pittsburgh, PA (US)

(72) Inventors: Herman Herman, Gibsonia, PA (US); Zachary T. Bonefas, Urbandale, IA (US); Carlos Vallespi-Gonzalez, Pittsburgh, PA (US); Johannes Josef Zametzer, Zweibruecken (DE)

(*) Notice: Subject to any disclaimer, the term of this patent is extended or adjusted under 35 U.S.C. 154(b) by 3 days.

(21) Appl. No.: 14/243,323

(22) Filed: Apr. 2, 2014

(65) Prior Publication Data

US 2014/0290199 A1    Oct. 2, 2014

Related U.S. Application Data (60) Provisional application No. 61/807,376, filed on Apr. 2, 2013.

(51) Int. Cl.
G01C 22/00 (2006.01)
G05D 1/00 (2006.01)
(Continued)

(52) U.S. Cl.
CPC ............ *A01D 43/073* (2013.01); *A01D 43/087* (2013.01)

(58) Field of Classification Search
CPC .. B65G 2203/041; B65G 67/04; B65G 67/24; G05B 2219/45052; G05B 2219/42249; G05D 2201/0201; G05D 1/0251; A01D 43/087; A01D 43/073; A01D 41/1217

USPC ............... 701/28, 50, 300, 408, 49; 340/612; 348/89, 50; 414/345, 389; 56/10.2 R, 56/16.6; 460/114

See application file for complete search history.

(56) References Cited

U.S. PATENT DOCUMENTS 4,401,403 A   8/1983   Johnson et al.
4,441,846 A   4/1984   Johnson
(Continued)

FOREIGN PATENT DOCUMENTS

DE           4426059 A1    1/1996

OTHER PUBLICATIONS

Moller, Jens, Computer vision—A versatile technology in automation of agriculture machinery, Key Note Report, 21st Annual Meeting, Bologna, EIMA International, Nov. 13-14, 2010.
(Continued)

*Primary Examiner* — Árpád Fábián-Kovács
(74) *Attorney, Agent, or Firm* — David G. Oberdick; Michael G. Monyok (57) ABSTRACT

Present invention is an adjustable transfer device for unloading processed crop onto a container of a transport vehicle including a control arrangement with an electronic control unit, among other integrated components. Electronic control unit calculates position of expected point of incidence of crop flow on the container within field of view of optical image capture device, displays image of container together with symbol representing calculated expected point of incidence of crop flow on container on display, receives adjustment inputs from user interface for adjusting position of actuator and thus of adjustable transfer device, updates position of symbol in image on display, receives confirmation input from user interface once symbol in image on display is in appropriate position, derives at least one feature in image representing container, and tracks container within output signal of image processing system based on retrieved image feature and controls actuator accordingly to fill container with crop.

13 Claims, 9 Drawing Sheets

(51) Int. Cl.
*A01D 43/073* (2006.01)
*A01D 43/08* (2006.01)

(56) References Cited

U.S. PATENT DOCUMENTS

| | | | |
|---|---|---|---|
| 4,529,348 A | 7/1985 | Johnson et al. | |
| 4,573,849 A | 3/1986 | Johnson et al. | |
| 5,749,783 A * | 5/1998 | Pollklas | A01D 43/073 414/345 |
| 6,097,425 A | 8/2000 | Behnke et al. | |
| 6,943,824 B2 | 9/2005 | Alexia et al. | |
| 8,234,047 B2 | 7/2012 | Madsen et al. | |
| 8,626,406 B2 * | 1/2014 | Schleicher | A01D 43/086 701/24 |
| 8,909,389 B2 * | 12/2014 | Meyer | A01B 69/008 460/1 |
| 2002/0083695 A1 * | 7/2002 | Behnke | A01B 69/008 56/119 |
| 2003/0037527 A1 * | 2/2003 | Hettiger | A01D 43/087 56/16.6 |
| 2003/0174207 A1 * | 9/2003 | Alexia | A01D 43/073 348/89 |
| 2009/0044505 A1 * | 2/2009 | Huster | A01D 43/087 56/10.2 R |
| 2010/0108188 A1 | 5/2010 | Correns et al. | |
| 2010/0332051 A1 | 12/2010 | Kormann | |
| 2011/0061762 A1 * | 3/2011 | Madsen | A01D 43/087 141/1 |
| 2011/0064274 A1 * | 3/2011 | Madsen | A01D 43/087 382/104 |
| 2012/0004815 A1 * | 1/2012 | Behnke | A01D 41/127 701/50 |
| 2012/0316737 A1 * | 12/2012 | Missotten | A01D 43/087 701/50 |
| 2013/0211658 A1 * | 8/2013 | Bonefas | B65G 67/24 701/28 |
| 2013/0213518 A1 * | 8/2013 | Bonefas | A01D 75/00 141/1 |
| 2013/0227922 A1 * | 9/2013 | Zametzer | A01D 43/073 56/10.2 R |
| 2014/0224377 A1 * | 8/2014 | Bonefas | A01D 43/073 141/1 |
| 2014/0300707 A1 * | 10/2014 | Viaene | A01D 43/087 438/50 |

OTHER PUBLICATIONS

European Search Report for European application EP14163185 dated Sep. 19, 2014.

* cited by examiner

OPTICAL IMAGE CAPTURE FOR CONTROLLING A POSITION OF A HARVESTER TRANSFER DEVICE

CROSS-REFERENCE TO RELATED APPLICATIONS

This application claims priority to U.S. Provisional Application Ser. No. 61/807,376, titled CONTROL ARRANGEMENT AND METHOD FOR CONTROLLING A POSITION OF A TRANSFER DEVICE OF A HARVESTING MACHINE, filed Apr. 2, 2013, incorporated by reference herein in its entirety.

FIELD OF THE DISCLOSURE

The present invention pertains to a control arrangement for controlling a position of an adjustable transfer device of a harvesting machine.

BACKGROUND OF THE DISCLOSURE

Forage harvesters are used in agriculture to harvest plants from a field, to chop them and to unload them by means of an adjustable transfer device onto a container of a transport vehicle that drives on a side of the forage harvester. The position of the adjustable transfer device, normally arranged in the form of a spout, can be controlled by an operator by means of inputs on a hydraulic handle and actuators, normally hydraulic cylinders, in order to move the adjustable transfer device into a position in which the crop is unloaded onto the container of the transport vehicle, but not onto the ground. Usually, the adjustable transfer device can be rotated around a vertical axis, tilted around a horizontal axis to adjust the height of its outer end, and an end flap can be rotated in order to define the exhaust direction of the crop.

Since the control of the adjustable transfer device is exhausting for the forage harvester operator, automatic solutions have been proposed for controlling the transfer device that use data on the relative position of the harvesting machine and the container, or a optical image capture device with an image processing system. The latter however are not always able to identify the container correctly, in particular when a field is opened, i.e. the forage harvester harvests a first strip of the field with standing crop on both sides such that the transport vehicle needs to follow the forage harvester, and the container to be filled is towed behind a tractor following the forage harvester, such that the distance between the forage harvester and the container is relatively large.

SUMMARY OF THE DISCLOSURE

A harvesting machine comprises a crop receiving header, a crop processing unit for processing crop received from the header and an adjustable transfer device for unloading processed crop onto a container of a transport vehicle. A control arrangement for controlling a position of the adjustable transfer device of the harvesting machine includes a optical image capture device or camera mounted on the harvesting machine. The optical image capture device has a field of view and an image signal output connected to an image processing system. The control arrangement further comprises an electronic control unit connected to an output of the image processing system. At least one actuator for adjusting the position of the adjustable transfer device is controlled by the electronic control unit. At least one sensor for sensing the actuator-controlled position of the adjustable transfer device has a signal output connected to the electronic control unit. Further, a display unit and an user interface connected to the electronic control unit.

The electronic control unit is operable to perform or execute the following steps:

(a) to display an image of the container captured by the optical capture device overlaid with a symbol representing, for example, but not limited to, a predetermined location of the container, such as a front edge, or incidence of crop flow ion the container, on the display unit, (b) to calculate a position of the spout relative to a predetermined location of a container and an expected point of incidence of crop flow on a container within the field of view of the optical image capture device based upon a sensor signal from at least one sensor and an output signal of the image processing system, (c) to receive adjustment inputs from the user interface for adjusting the position of the actuator and thus of the adjustable transfer device and to update the position of the symbol overlaid on the image on the display unit according to the altered sensor output;

(d) to receive a confirmation input from the user interface once the symbol in the image on the display is in an appropriate position with respect to the displayed image of the container in order to fill the container with crop, and to derive at least one feature in the image representing the container; and (e) to subsequently track the container within the output signal of the image processing system based on the image feature retrieved in step (d) and to control the actuator accordingly to fill the container with crop.

BRIEF DESCRIPTION OF THE DRAWINGS

An embodiment of the disclosure is described in detail below with reference to the accompanying drawings wherein.

DETAILED DESCRIPTION OF THE DRAWINGS

Figure 1A:
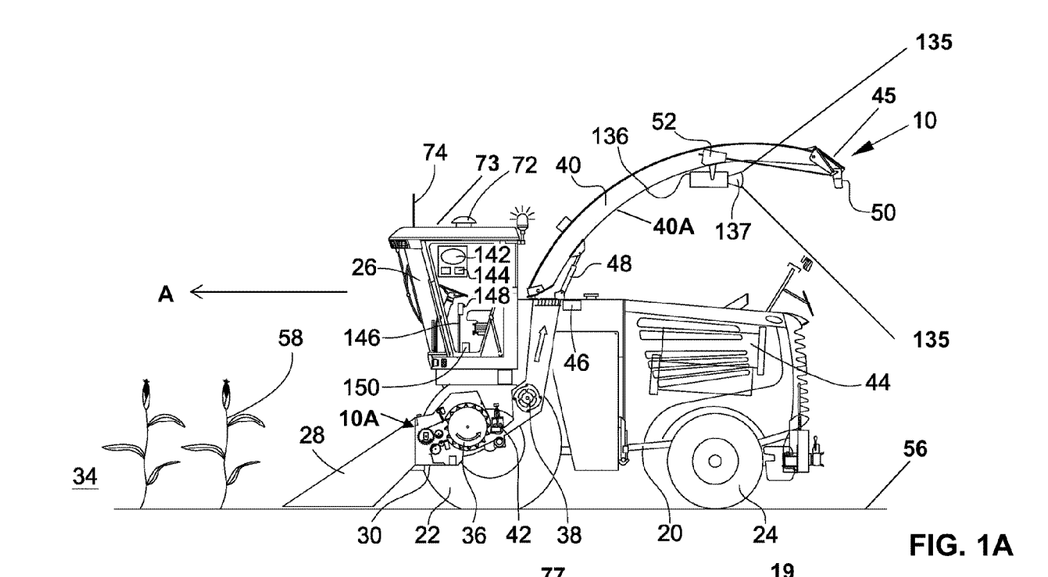
FIG. 1A is a side view of a harvesting machine (e.g., forage harvester)
Figure 1B:
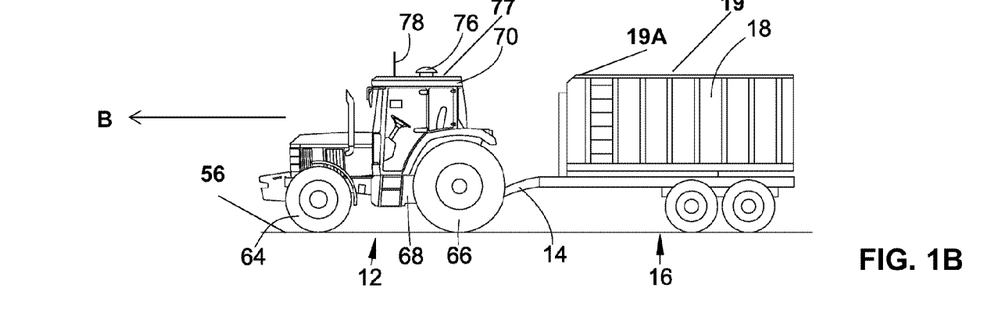
FIG. 1B is a side view of a transport vehicle, which follows the harvesting machine.

A combination of two agricultural machines shown in FIGS. 1A and 1B comprises a self-propelled harvesting machine 10 in the form of a forage harvester (FIG. 1A) and a transport vehicle 12 (FIG. 1B) in the form of a self-propelled tractor, which, by way of a tow bar 14 pulls a trailer 16, which comprises a container 18.

The harvesting machine 10 has a frame 20, which is carried by front-driven wheels 22 and steerable rear wheels 24. The harvesting machine 10 is operated from a driver's cabin 26, from which an operator can see a harvesting attachment 28, in the form of a corn header attachment, which is affixed to an entry channel 30 on the front side 10A of the forage harvester 10. Crop plants 58 harvested from a field 34 by way of the harvesting attachment 28 are conveyed to a cutter head 36 via a gathering conveyor (not shown) with pre-compression rollers (not shown) located in the entry channel 30. The cutter head 36 acts in this embodiment as a crop processing unit for processing the crop plants 58 received from the harvesting attachment 28, hence chops them into small pieces and delivers them to a discharge accelerator 38. A post-processing device 42 with two kernel processing rollers (not shown) is located removably in the crop flow between the cutter head 36 and the discharge accelerator 38. The post-processing device 42 can be moved into an inoperative position in case that it is not needed, for example for a grass harvest, or entirely removed from the harvesting machine 10.

The driving of the aforementioned drivable units of the harvesting machine 10 and the harvesting attachment 28 takes place by way of a combustion engine 44. The crops discharged from the discharge accelerator 38 exit the harvesting machine 10 to the container 18 that can be moving behind, as shown in FIGS. 1A and 1B, or alongside the harvesting machine 10, via an adjustable transfer device 40 in the form of a discharge spout 45, which can be rotated around an approximately vertical axis by way of a first actuator 46 and can be adjusted at a tilt angle by way of a second actuator 48. The discharge direction can be changed by way of a flap 50, the angle of which can be adjusted by way of a third actuator 52.

The transport vehicle 12 and the trailer 16 with the container 18 have a conventional structure. The transport vehicle 12 comprises front, steerable wheels 64 and rear, driven wheels 66, which are supported on a carrying structure 68, which carries a driver's cabin 70.

FIGS. 1A and 1B show the harvesting machine 10 and the transport vehicle 12, respectively, in side views. One can see that the harvesting machine 10 drives over the field 34 in a forward direction A, which is in FIG. 1A to the left, in order to harvest the crop plants 58. The transport vehicle 12, FIG. 1B, follows behind the harvesting machine 10 in a forward direction B. This situation occurs when a field 34 is opened, for example when only an entry to the field is available at the center of a side edge of a field 34, such that there is no possibility for the transport vehicle 12 to drive alongside the harvesting machine 10 without damaging crop plants 58. During subsequent passes over the field 34, the transport vehicle 12 can drive on a harvested part of the field 34 on the left or right side of the harvesting machine 10. The harvesting machine 10 then moves along an edge of crops, which represents a border between a harvested area of the field 34 and the still standing plant population consisting of crop plants 58 on the field 34, and is reaping the crop plants 58. The transport vehicle 12 is then thus moving on the harvested part 56 of the field, parallel to the harvesting machine 10, along a path on which the crop plants 58 chopped by the harvesting machine 10 arrive at the container 18 by way of the adjustable transfer device 40. The transport vehicle 12 must therefore always move parallel next to the harvesting machine 10.

The harvesting machine 10 is steered by a driver sitting in the driver's cabin 26 or by a steering device, which operates automatically. The transport vehicle 12 is equipped with a steering device so as to facilitate or automate the parallel movement relative to the harvesting machine 10, and which can be omitted. The harvesting machine 10 could also be any other self-propelling harvesting machine, such as a potato or beet harvester.

The harvesting machine 10 is equipped with a first position-determining device 72, which is located on the roof 73 of the cabin 26. A first radio antenna 74 is also positioned there. The transport vehicle 12 is equipped with a second position-determining device 76, which is located on roof 77 of the cabin 70. A second radio antenna 78 is also located there.

Figure 2:
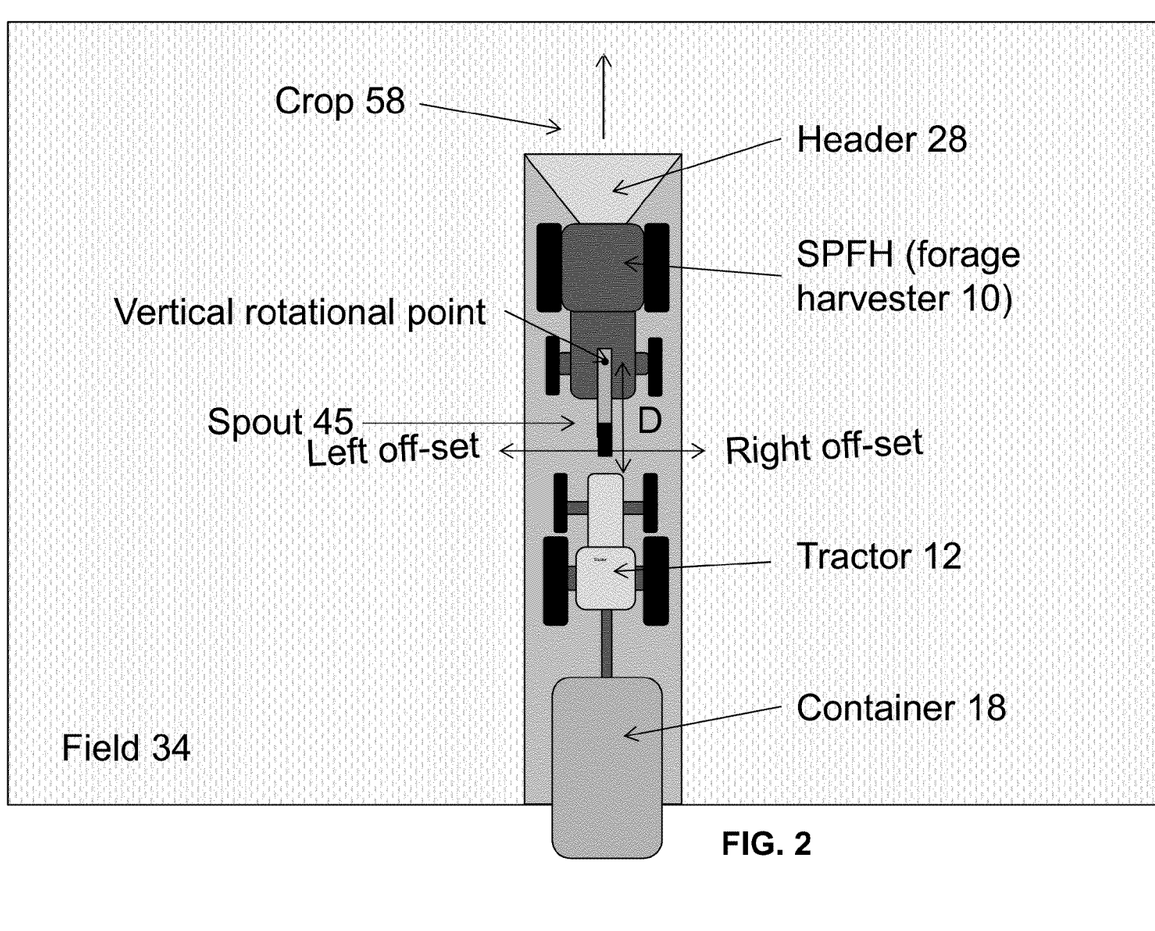
FIG. 2 is a top view illustration of a rear unloading arrangement of the harvesting vehicle and the transport vehicle following the harvesting vehicle in a field.

Now turning to FIG. 2, which is a top view of the harvesting machine (forage harvester) 10 opening a field by harvesting and chopping the crop plants 58 from a section of the field as it moves forward. The forage harvester 10 then unloads the chopped material through the spout 45 to a container 18 (e.g., cart) pulled by the transport vehicle 12 (e.g. tractor), which is following behind the harvesting machine 10.

In FIG. 2., the distance D of the harvesting machine (forage harvester) 10 and the transport vehicle 12 can be variable, and the spout 45 needs to be adjusted so the material coming out from the spout 45 will land in the container 18. In addition, the transport vehicle 12 path might not be perfectly aligned with the forage harvester 10, and the spout 45 also needs to be adjusted to take into account the left/right offset. Now, reference is made to FIGS. 3A and 3B, in which among other things, the individual components of the position-determining devices 72, 76, an electronic control unit 112, actuators 46, 48, 52 for the adjustment of the adjustable transfer device 40 and discharge spout 45, sensors 128, 130, 132 for the detection of their actual position and the steering devices of the transport vehicle 12 (FIG. 3B) and the harvesting machine 10 (FIG. 3A) are schematically shown. Electronic control unit 112 includes a processor and memory. Operating and executable software are stored in memory and executed by the processor. Sensor 128 detects the position of the adjustable transfer device 40 around the vertical axis, as adjusted by actuator 46. Sensor 130 detects the tilt position of the adjustable transfer device 40, as adjusted by actuator 48. Sensor 132 detects the angular position of the flap 50, as adjusted by actuator 52. Some of the above mentioned components are also illustrated in FIG. 1A.

Figure 3A:
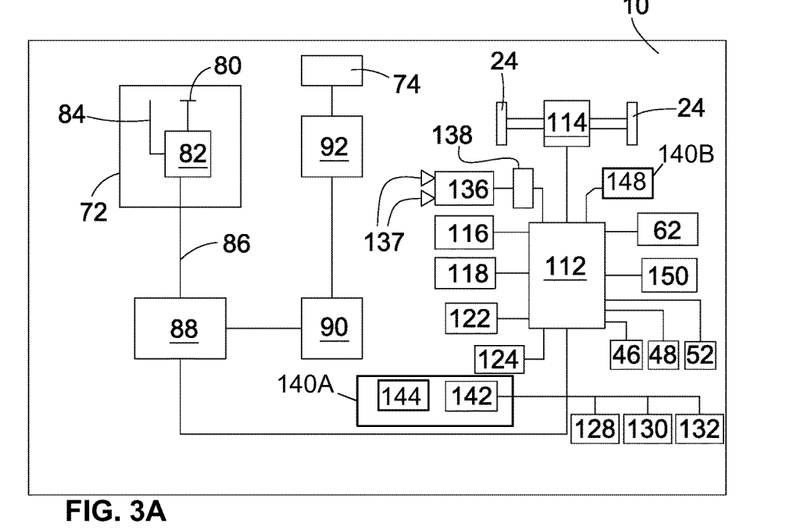
FIG. 3A is a schematic diagram of a control arrangement controlling the position of an adjustable transfer device of the harvesting machine.

Now turning to FIG. 3A, the first position-determining device 72 is on board the harvesting machine 10 and comprises an antenna 74 and an evaluation circuit 82, which is connected to the antenna 80. The antenna 80 receives signals from satellites of a position-determining system, such as GPS, Galileo, or Glonass, which are supplied to the evaluation circuit 82. With the aid of the signals of the satellites, the evaluation circuit 82 determines the actual position of the antenna 80. The evaluation circuit 82 is also connected to a correction data-receiving antenna 84, which receives radio waves radiated from reference stations at known locations. With the aid of the radio waves, correction data for the improvement of the accuracy of the position-determining device 72 are produced by the evaluation circuit 82. The evaluation circuit 82 transmits its position data by way of a bus line 86 to a control device 88.

The control device 88 is connected via an interface 90 to a reception and transmission device 92, which is in turn connected to the radio antenna 74. The reception and transmission device 92 receives and generates radio waves, which are picked up and radiated by the antenna 74.

Figure 3B:
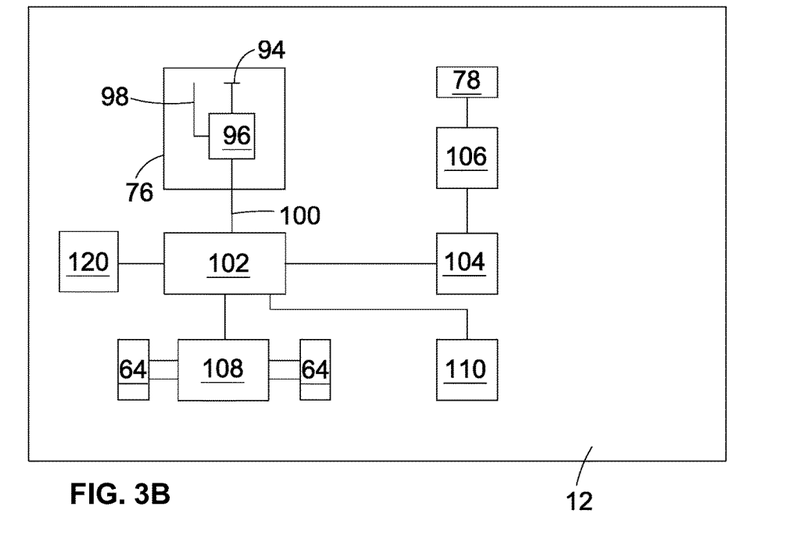
FIG. 3B is a schematic diagram of a control arrangement controlling the position of the transport vehicle.

Analogously, the second position-determining device 76 is located on board the transport vehicle 12. The second position-determining device 76 comprises an antenna 94 and an evaluation circuit 96, which is connected to the antenna 94.

The antenna 94 receives signals from satellites of the same position-determining system as the antenna 80, which are supplied to the evaluation circuit 96. With the aid of the signals of the satellites, the evaluation circuit 96 determines the actual position of the antenna 94. The evaluation circuit 96 is also connected to a correction data-receiving antenna 98, which receives radio waves radiated from reference stations at known sites. With the aid of the radio waves, correction data for the improvement of the accuracy of the position-determining device 76 are generated by the evaluation circuit 96.

By way of a bus line 100, the evaluation circuit 96 transmits its position data to a control device 102. The control device 102 is connected via an interface 104 to a reception and transmission device 106, which in turn is connected to the radio antenna 78. The reception and transmission device 106 receives and generates radio waves, which are picked up and radiated by the antenna 78. By the reception and transmission devices 92, 106 and the radio antennae 74, 78, it is possible to transmit data from the control device 88 to the control device 102 and vice-versa. The connection between the radio antennae 74, 78 can be direct, for example, in a permissible radio range, such as citizen's band radio, or something similar, or made available via one or more relay stations, for example, if the reception and transmission devices 92, 106 and the radio antennae 74, 78 work according to the GSM or the UMTS standard or another suitable standard for mobile telephones.

The control device 102 is connected to a steering device 108, which controls the steering angle of the front, steerable wheels 64 of the transport vehicle 12. Furthermore, the control device 102 sends speed signals to a speed specification device 110, which, via a variation of the engine rpm of the transport vehicle 12 and/or the gear transmission, controls the speed of the transport vehicle 12. Moreover, the control device 102 is connected to a permanent storage unit 120.

On board the harvesting machine 10, the control device 88 is connected to the electronic control unit 112, which, together with the actuators 46, 48, 52 it controls and the sensors 128, 130, 132 connected to it, forms a control arrangement for the control of the transfer of the crops from the harvesting machine 10 to the container 18 of the transport vehicle 12. The electronic control unit 112 is connected to a steering device 114, which controls the steering angle of the rear, steerable wheels 24. Furthermore, the electronic control unit 112 sends speed signals to a speed specification device 116, which, via a variation of the gear transmission, controls the propelling speed of the harvesting machine 10. The electronic control unit 112 is also connected to a throughput sensor 118, which detects the distance between the pre-compression rollers in the entry channel 30, with a sensor for the detection of the position of sensing arms 62 placed on a divider tip of the harvesting attachment 28; a permanent storage unit 122, via valve devices (not shown) with the actuators 46, 48, and 52 and with sensors 128, 130, 132, which respectively detect the position of one of the actuators 46, 48, and 52, and with an optical image capture device 136, which is placed more or less in the middle of the adjustable transfer device 40 on its left or right or underside 40A (FIG. 1A), and during the harvesting operation, is aligned on the container 18 and is preferably implemented as a stereo-camera having two lenses 137 and two image sensors (not shown) arranged one above the other or side by side. The electronic control unit 112 receives the signals from the optical image capture device 136 via an image processing system 138 that processes the image signals from a signal output of the optical image capture device 136 in order to extract the position of features of the container 18 within the field of view 135 of the optical image capture device 136.

Further, the electronic control unit 112 is connected to an user interface 140A mounted in the cabin 28. The user interface 140A comprises a display unit 142 and an user interface with keys 144, which could also be complemented or replaced by a touch-sensitive display unit 142A. Another user interface 140B with at least one key 148 is provided on a hydraulic handle 146 (not shown) that is pivotally mounted and coupled with a sensor 150 connected to the electronic control unit 112 in order to receive manual propelling speed commands by the operator in the cabin 28. Some of the above mentioned components are also illustrated in FIG. 1A.

Figure 4A:
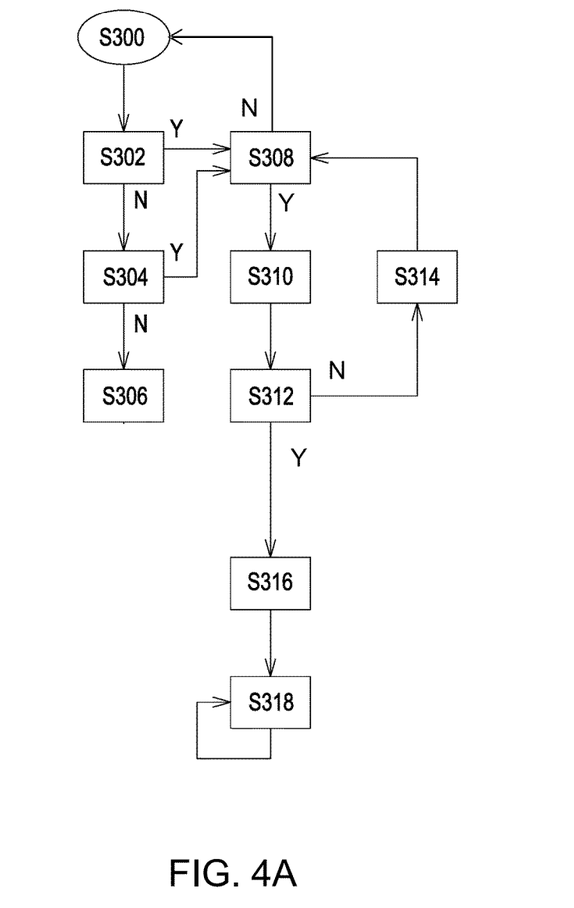
FIGS. 4A and 4B are flow diagrams showing operation of the control arrangement.
Figure 4B:
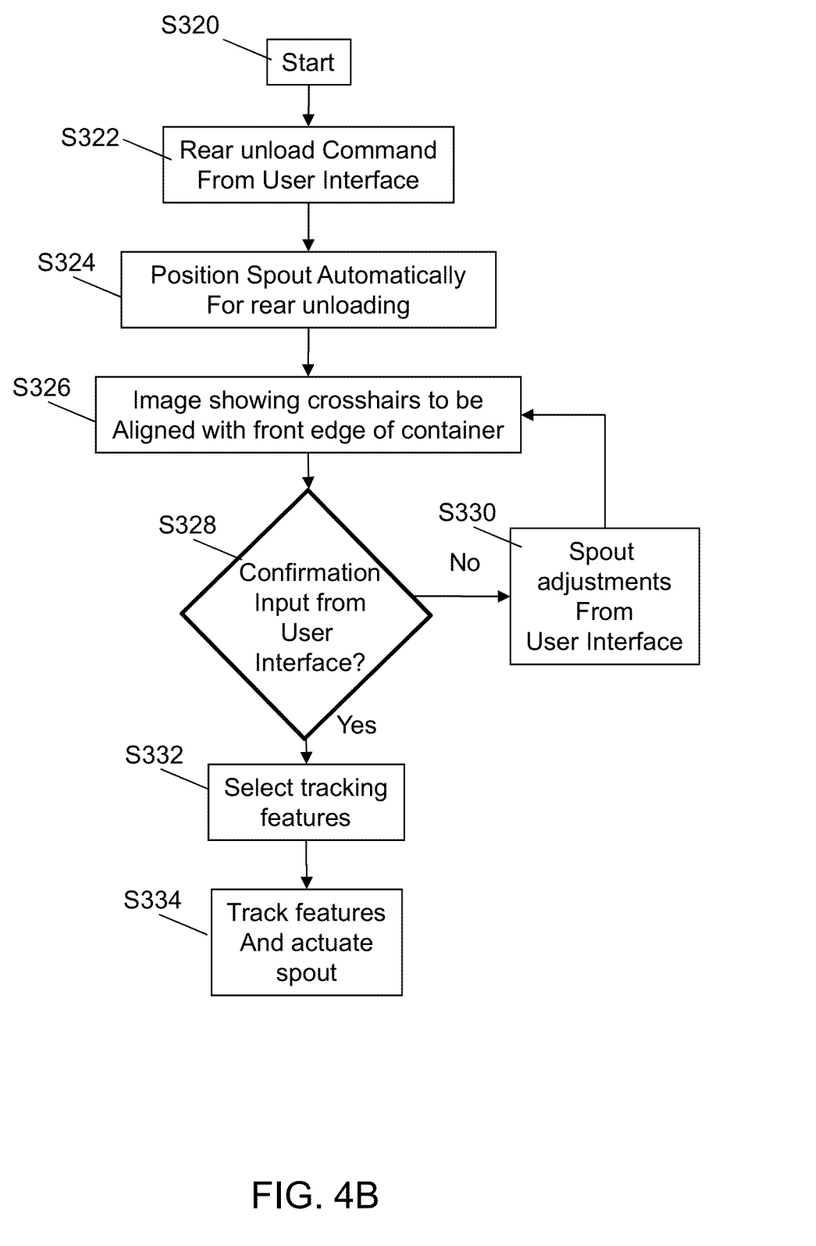

Operation of the electronic control unit 112 are schematically shown in FIGS. 4A and 4B. Now turning to FIG. 4A, after start in S300, i.e. after a harvest operation switch (which might be one of the keys 144 or another key, not shown, on a dashboard in the cabin 28) of the harvesting machine 10 is switched on, and the operation of the electronic control unit 112 is initialized, step 302 follows. In step 302, it is checked whether a container search command was received from the user interfaces 140A, 140B (FIG. 3A), thus from a key 144 or a key 148 assigned to input the desire of the operator to locate a container 18 at a position where it is difficult to locate by the optical image capture device 136. Such a position is, in particular, the position behind the harvesting machine 10 and the transport vehicle 12, as shown in FIGS. 1A and 1B, since the container 18 is relatively far away from the optical image capture device 136. Under certain circumstances, as bad visibility or a container 18 having a color similar to the color of the field 34, it can however also be useful and possible to input a container search command when the container 18 is alongside the harvesting machine 10.

If the result of step S302 is "no," step S304 follows. In step S304, it is checked whether the adjustable transfer device 40 is in a rear unloading position according to the signal of the sensor 128. If this is not the case, step S306 is executed, in which the electronic control unit 112 controls actuators 46, 48, 52 according to the signal from the optical image capture device 136, processed by image processing system 138. This means that in the image from the optical image capture device 136, features are identified, for example the upper edge 19 of the container 18 (FIG. 1B), and the actuators 46, 48, 52 are controlled such that the crop flow expelled by the adjustable transfer device 40, hits the interior of the container 18. A feedback for the impact point of the crop plants 58 on the container 18 can be derived from the image signal from the optical image capture device 136. Further, since the optical image capture device 136 is a stereo camera, its signals allow to estimate a distance between the harvesting machine 10 and the container 18 and the height of the upper edges 19 of the container 18 over ground, such that the actuators 46, 48 and 52 can be controlled according to a known kinematic model of the free crop flow downstream the adjustable transfer device 40.

On the other hand, if the result in step S302 or S304 is "yes," the electronic control unit 112 proceeds with step S308. This step and the following ones are used to find a container 18 in the image of the optical image capture device 136 in difficult cases, such as a rear unloading situation shown in FIGS. 1A and 1B, in which it is not easy for the electronic control unit 112 to identify the container 18 in the mentioned image.

In step 308, the electronic control unit 112 calculates a position of an expected point of incidence of the crop flow on the container 18, if it is within the field of view 135 of the optical image capture device 136 (FIG. 1A). The calculation first identifies the container 18 in the field of view 135 in an image captured by the optical image capture device 136.

Next, expected points of incident within the container 18 are calculated based on the captured image. Thus, if no container 18 is in the field of view 135 of the optical image capture device 136, the process terminates here and goes back to step S300. If on the other hand a container 18 is in the field of view 135 of the optical image capture device 136, the position of an expected point of incidence of the crop flow on the identified container 18 is calculated, based upon the sensor signal in order to learn the direction of the crop flow after leaving the adjustable transfer device 40, and based on an output signal of the image processing system 138, since the electronic control unit 112 needs to know the distance between the harvesting machine 10 and the container 18 in order to derive the expected point of incidence. The distance between the discharge spout 45 of harvesting machine 10 (or the machine 10 itself, e.g. the rotation point of the discharge spout 45 around the vertical axis) and the front edge 19A of the container 18 can be derived from the signal of the image processing system 138 since the optical image capture device 136 is a stereo camera. If the optical image capturing device 136 were a monocular camera, the size (pixels) of the near edge of the container 18 in the image could be used as an estimate for the mentioned distance. Additionally or instead, the mentioned distance can be derived from position data of the harvesting machine 10 using the position-determining device 72 and a position of the transport vehicle 12 transmitted by the radio antennas 74, 78. The orientation of the spout 45 based on position of actuator 46, 48, or 52 is used to determine the path of crop flow.

In step S308, the known model kinematic of the free crop flow downstream the adjustable transfer device 40 is applied, like in step S306, to calculate where the crop flow would theoretically intersect top plane of the container 18 opening. This position can be calculated in absolute coordinates, for example using the position data from the first position-determining device 72, or in relative coordinates with an origin for example at the rotation point of the adjustable transfer device 40 around the approximately vertical axis.

Step S308 is followed by step S310, in which an image of the container 18 is shown on the display unit 142 together with a symbol 800 (FIGS. 8A and 8B) representing alignment of spout 45 with front edge 19A of container 18 that coincides with the calculated expected point of incidence of the crop flow on the container discussed above. In other words, the crop flow will intersect the calculated expected point of incidence when symbol 800 is aligned with front edge 19A of container 18. The image can be non-processed, i.e. directly come from the optical image capture device 136, or be pre-processed by the image processing system 138 in order to remove unimportant details and to emphasize, for example by adding color or changing brightness, features identified in the image that might resemble the container 18.

Figure 8A:
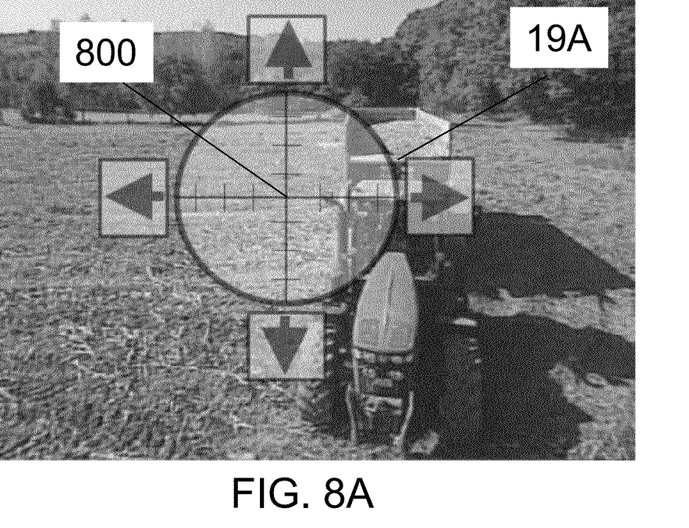
FIGS. 8A and 8B are photographs illustrating a transport vehicle with a container with an edge used for alignment of indicia, such as cross-hairs, therewith for spout orientation.
Figure 8B:
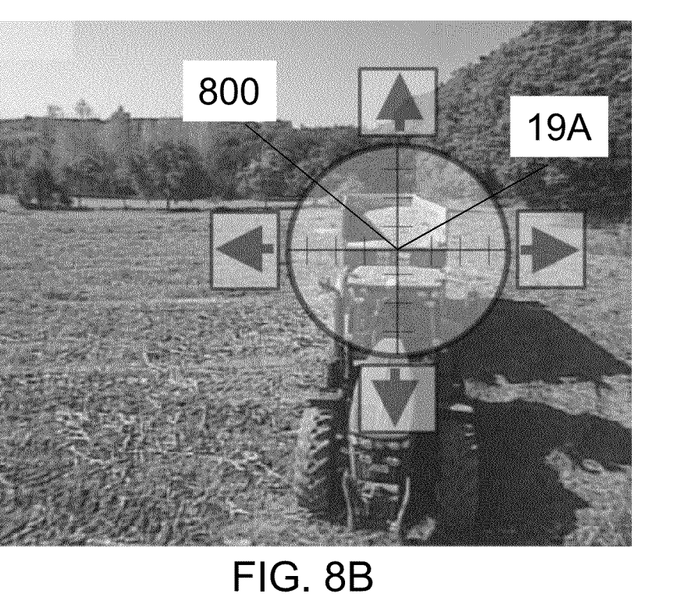

In step S312, the electronic control unit 112 checks whether a confirmation input was received via an assigned one of the keys 144 and/or 148 from the user interface 140A, 140B. By depressing the key, the operator in the cabin 28 can confirm that according to his or her opinion the symbol in the image on the display unit 142 is in an appropriate position with respect to the displayed image of the container 18 to fill the container 18 with crop (FIG. 8B). This confirmation input could also be input by means of a touch-sensitive display unit 142A or orally or by a suitable gesture detector. Thus, if the result of step S312 is "no," it can be assumed that the symbol 800 shown on the display unit 142 is outside the image of the container 18.

In this case, step S314 follows in which the electronic control unit 112 can receive adjustment inputs from the user interface (by means of keys 144 and/or 148) for adjusting the position of one or more of the actuators 46, 48, 52 and thus of the adjustable transfer device 40. The electronic control unit 112 thus controls the position of the actuators 46, 48 and/or 52. Step S314 is followed again by step S308, in which a new image is taken by the optical image capture device 136, and by step S310, in which the position of the symbol 800 in the image on the display unit 142 is updated according to the output of the sensors 128, 130, 132, which is now changed due to the movement of one or more of the actuators 46, 48, 52. In the situation where symbol 800 is not aligned with front edge 19A of container 18 (FIG. 8A.), the operator can move symbol 800 in alignment with front edge 19A of container 18 thereby actuating actuator 46 to rotate spout 45 into position aligned with container 18 for rear unloading in which the symbol 800 is located on the display unit 142 aligned with the image of front edge 19A of the container 18 (FIG. 8B). The adjustment of the symbol 800 to the front edge 19A of the container 18 can be performed, if necessary, in the horizontal direction and in the vertical direction, be it simultaneously or subsequently, dependent on the operator's choice or as provided by an automated system. Another embodiment of the present invention considers the container 18 being pulled on a side of the harvesting machine 10 where the symbol 800 can be adjusted to align with the upper lateral edge of the container 18 or a side opening thereof. Other embodiments of the present invention can accommodate container orientations relative to the harvesting machine 10, whether the container is aft, forward, or along-side of the harvesting machine 10, and any feature of the container 18 within the field of view of the optical capture device 136.

On the other hand, if the operator has confirmed in step S312 that the symbol 800 in the image on the display unit 142 is in an appropriate position with respect to the displayed image of the container 18 (FIG. 8B.) to fill the container 18 with crop, step S316 is executed, in which the control unit 112 derives at least one feature in the image representing the container. This is relatively easy, since the container 18 can be assumed to be in close vicinity to symbol 800. The electronic control unit 112 thus uses in step S316 the known position of the symbol and suited features in the vicinity of the symbol 800 in the image. The electronic control unit 112 can identify the upper edges 19A of the container 18 in the image. The identified feature is preferably highlighted in the image on the display unit 142, for example by color or brightness.

In the following step S318, the electronic control unit 112 tracks the container 18 within the output signal of the image processing system 138 based on the image feature retrieved in step S316 and controls the actuators 46, 48, 52 in a suitable manner, as described with respect to step S306, in order to fill the container 18 with the harvested crop without spilling significant amounts of crop onto the ground. In step S318, actual images can be shown on the display unit 142 (FIG. 8B), like in step S310, in order to inform the operator about the position of the container 18 as detected by the electronic control unit 112 (preferably highlighting the detected and tracked feature of the container 18) and the expected location of the crop impact point on the container 18 by means of the symbol 800.

FIG. 4A can be summarized as follows:
S300: Start
S302: Container Search Command Received (key 148)
S304: Adjustable transfer device 40 in Rear Position (Sensor 128)
S306: Control Actuators 46, 48, 52 according to signal from image capture device (e.g., camera) 136.

S308: Calculate a position of the spout 45 (or transfer device) relative to a predetermined location of a container and an expected point of incidence of the crop flow on a container within the field of view of the optical image capture device based upon the sensor signal and on an output signal of the image processing system.

S310: Display an image of the container 18 together with a symbol 800 on the display unit representing the alignment of spout 45 with front edge 19A of container 18, which is coincident with the calculated expected point of incidence of the crop flow on the container. Though Step 310 is presented chronologically or sequentially following Step 308, one embodiment of the present invention (not illustrated) provides for Step 310 to precede Step 308.

S312: Confirmation input from the user interface received to confirm that the symbol in the image on the display is in an appropriate position with respect to the displayed image of the container to fill the container with crop?

S314: Receive adjustment inputs from the user interface for adjusting the position of the actuator(s) 46, 48, 52 and control the actuator(s) 46, 48, 52.

S316: Derive at least one feature in the image representing the container 18.

S318: Track the container 18 within the output signal of the image processing system based on the image feature retrieved in step S316 and control the actuator(s) accordingly to fill the container 18 with crop.

Now turning to FIG. 4B that can be summarized as follows:

S320: Start.

S322: Rear Unload Command from User Interface.

S324: Position spout automatically for rear unloading. Any commercially available software that performs the automated spout positioning function can be incorporated into the present invention. Electronic control unit 112 receives the rear unload command from the user interface 140A. The ECU 112 manipulates actuators 46, 48, 52 to position the spout 45 into a known orientation that is reasonable for rear unloading. Sensors 128, 130, 132 provide feedback to the ECU 112 to close the feedback loop on the orientation of the spout 45.

S326: Image showing a visual alignment indicator 800 (e.g., cross hairs, cross or target as shown in FIGS. 8A and 8B) to be aligned with front edge 19A of the container. The visual alignment indicator is created in the electronic control unit 112. The visual alignment indicator 800 is overlaid on top of the image from the camera 136 and streamed to the display unit 142 that the operator sees. Ideally, the operator would maneuver the spout 45 of the harvester 10 such that the visual alignment indicator 800 is pointed to the front edge 19A of the contain 18 and press a button to engage the system. The system would then identify the front edge 19A of the container 18 and track its position.

S328: Confirmation of input from operator (Yes or No)

S330: If S328 indicates no confirmation of input from operator, then spout adjustments are made and repeat S326.

S332: If S328 indicates confirmation of input from operator, then the tracking algorithm automatically chooses salient features to be used for tracking the front edge 19A of the container 18. The salient features are unique regions in the images that are on the front side of the container 18.

S334: Track features and actuate spout. Once the salient features on the front side of the container 18 are selected, the crosshairs 800 could either disappear from the overlay or the software could automatically adjust the crosshairs 800 to point at the center of the front edge 19A of the container 18.

It will become apparent that various modifications can be made without departing from the scope of the invention. For example, one or more functions of the electronic control unit 112 can be provided by separate electronic control units, not shown. In steps S306 and S318, control of the adjustable transfer device 40 can be augmented according to a relative position of the container 18 with respect to the harvesting machine 10 derived from position data of the harvesting machine 10 using the position-determining device 72 and a position of the transport vehicle 12 transmitted by the radio antennas 74, 94.

Figure 5:
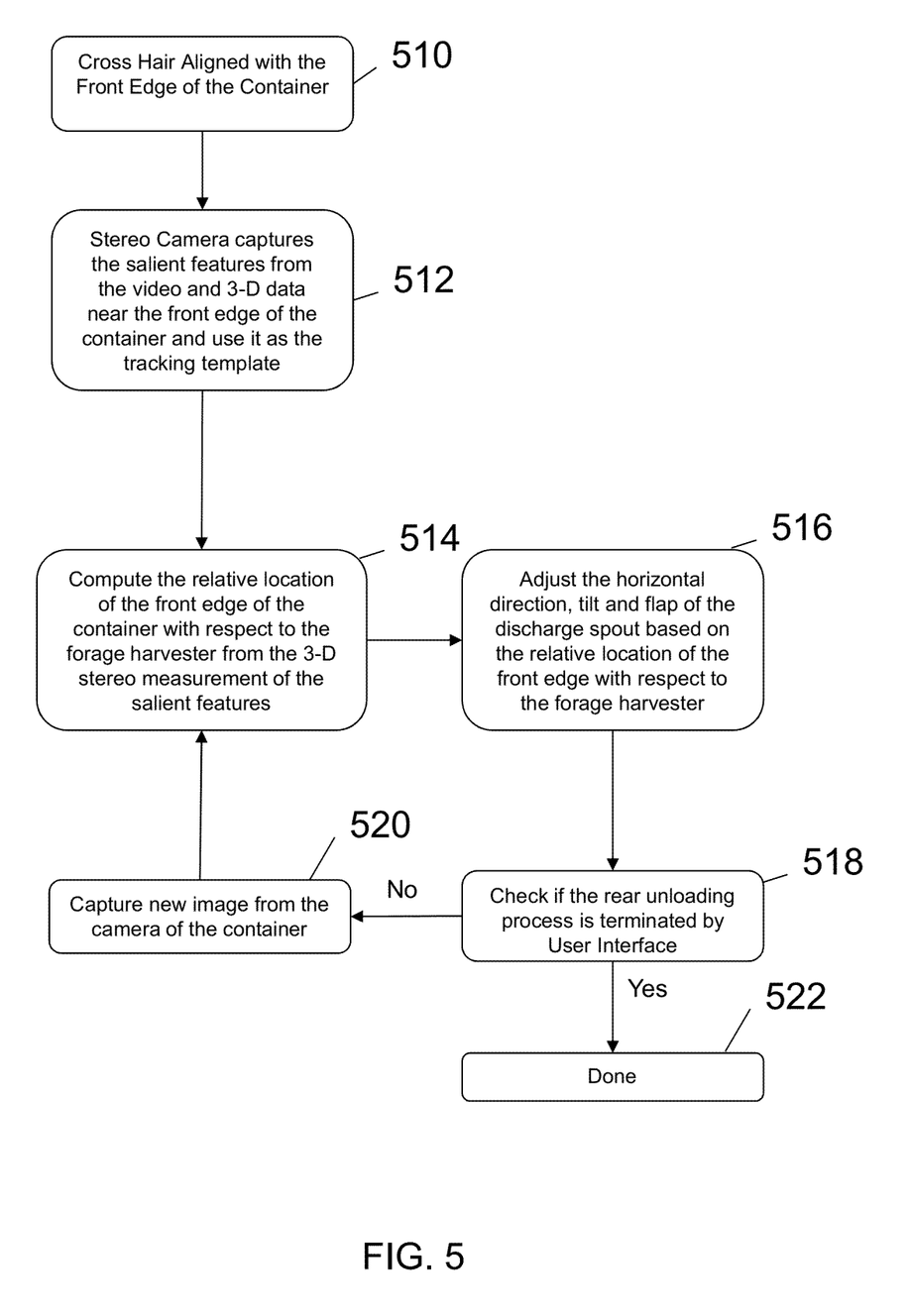
FIG. 5 is a flow chart of the tracking steps of an embodiment of the present invention.

Now turning to FIG. 5 to illustrate one embodiment of the tracking processes of the present invention for rear unloading.

Block 510: Indicator 800, such as cross hairs (FIGS. 8A and 8B), are aligned with the front edge 19A of the Container 18.

Block 512: Stereo Camera captures the salient features from the video (FIGS. 8A and 8B) and 3-D data near the front edge 19A of the container 18 and use it as the tracking template.

Block 514: The relative location of the front edge 19A of the container with respect to the forage harvester 10 is computed from the 3-D stereo measurement of the salient features. The salient features of the front edge 19A are identified automatically by the tracking algorithm based on unique appearance or shape.

Block 516: The horizontal direction, tilt and flap of the discharge spout is adjusted based on the relative location of the front edge 19A with respect to the forage harvester 10.

Block 518: A check is performed whether the rear unloading process is terminated by the operator. If the check is "Yes," then the process continues to Block 522 and the procedure to done. If the check is "No," then the process continues to Block 520 to capture a new image from the camera of the container and the process returns to Block 514 for continued processing.

Figure 6:
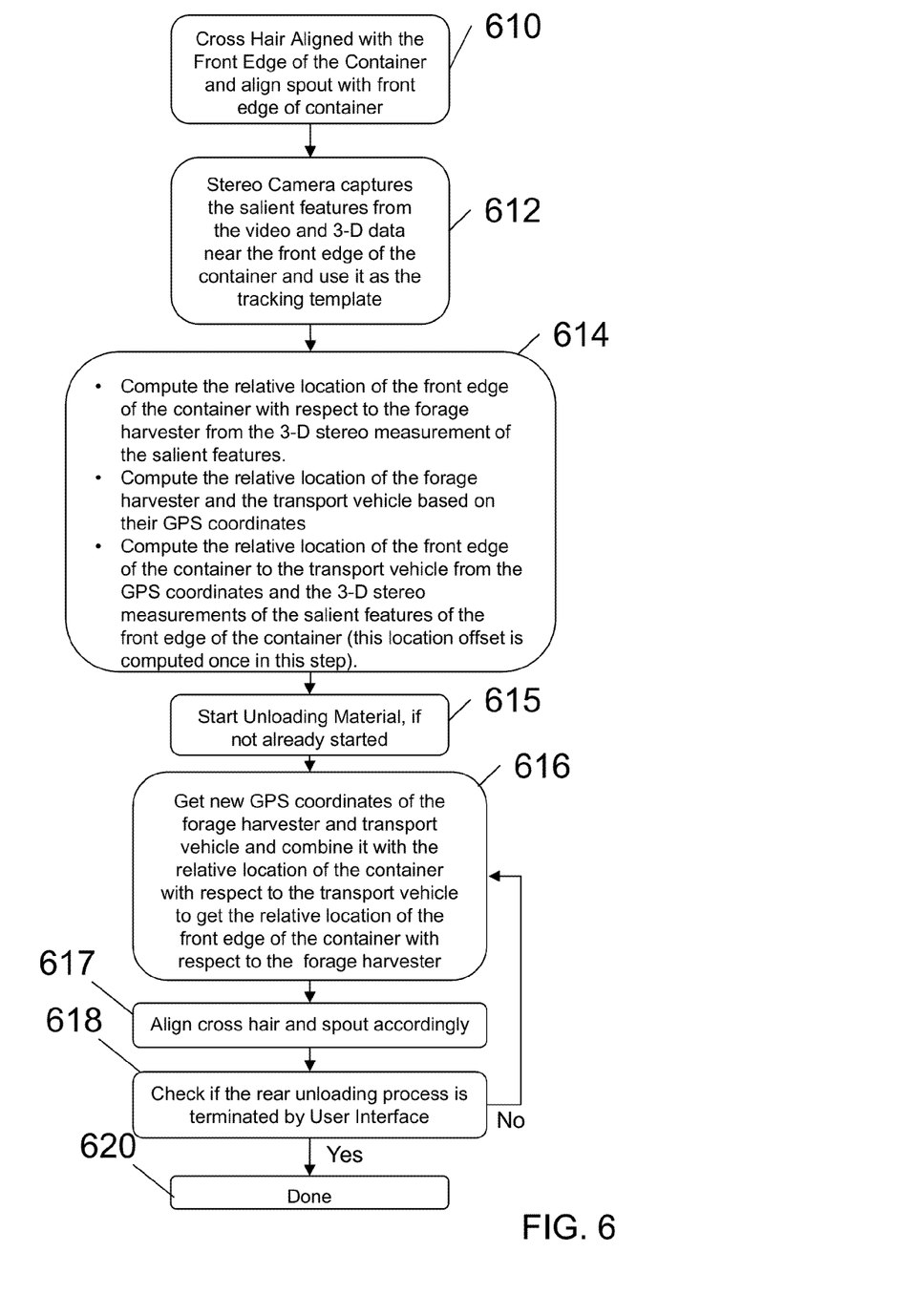
FIG. 6 is a flow chart of the tracking steps of another embodiment of the present invention utilizing GPS.
Figure 7:
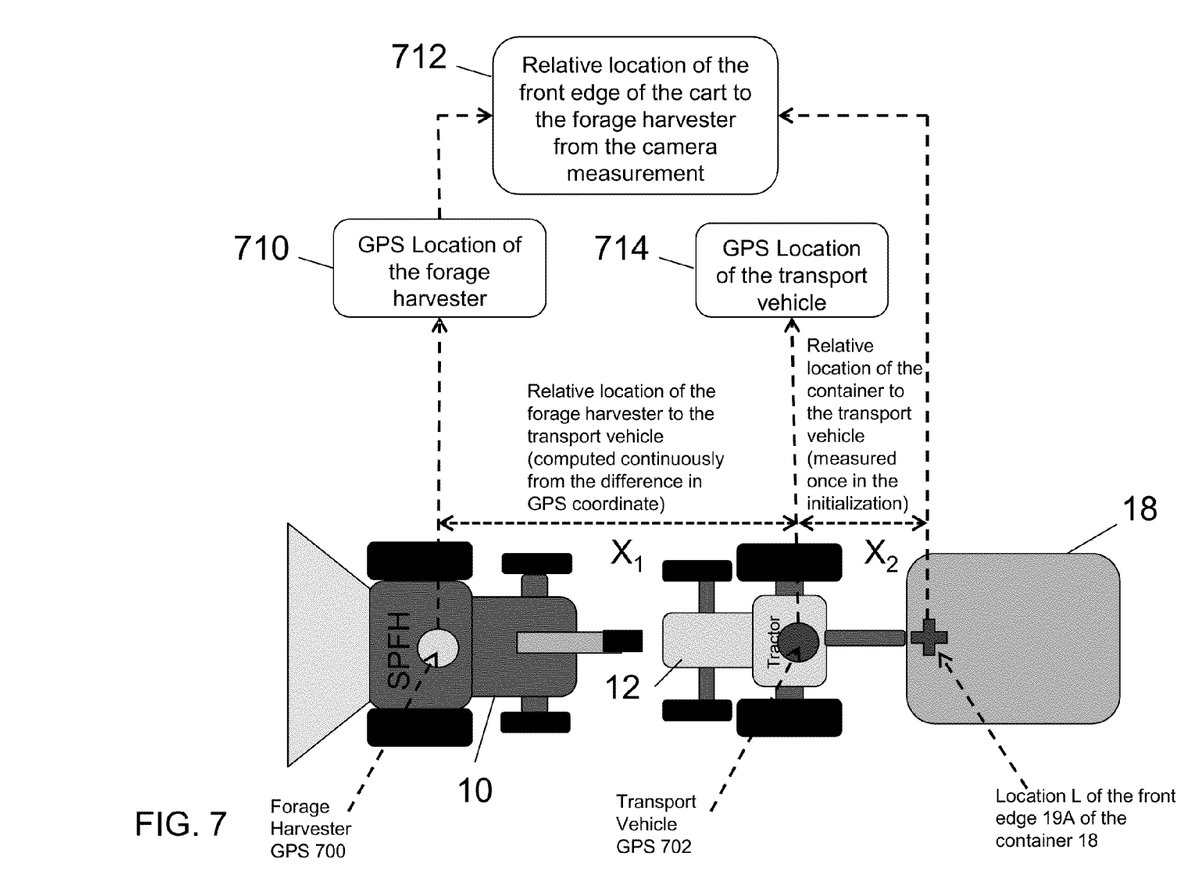
FIG. 7 is an illustration of one embodiment of the present invention utilizing GPS to track the transport vehicle relative to the harvesting vehicle.

Now turning to FIG. 6 for an alternative embodiment of the present invention that utilizes position measuring devices on both the harvesting machine and transporting vehicle to assist the optical capture device in measuring the relative motion between the harvesting machine (forage harvester) 10 and transport vehicle 12 of FIG. 7.

Block 610: An indicator 800, such as a cross hairs, is aligned with the front edge 19A of the container (FIGS. 8A and 8B) and spout 45 is adjusted to align with the front edge 19A of the container 18 as discussed above.

Block 612: A stereo camera 136 (FIG. 1A) captures the salient features from the video and 3-D data near the front edge 19A of the container and use it as the tracking template.

Block 614: A series of steps are performed:
Compute the relative location of the front edge 19A of the container with respect to the forage harvester 10 from the 3-D stereo measurement of the salient features.
Compute the relative location $X_1$ of the forage harvester 10 and the transport vehicle 12 based on their GPS coordinates from their respective GPSs 700, 702.
Compute the relative location $X_2$ of the first edge 19A of the container 16 to the transport vehicle 12 from the GPS coordinates and the 3-D stereo measurements of the salient features of the front edge 19A of the container 18 (relative location $X_2$ is an offset computed once in this step).

Block 615: Start Unloading Material, if not already started;

Block 616: New GPS coordinates of the forage harvester 10 and transport vehicle 12 are received and combined with the relative location $X_2$ of the container 18 with respect to the transport vehicle 12 to get the relative location $(X_1+X_2)$ of the container 18 with respect to the forage harvester 10.

Block 617: Align cross hair of indicator 800 and spout 45 accordingly to maintain accurate discharge of the material into container 18.

Block 618: A check is performed to determine whether the rear unloading process is terminated by the operator. If check is "Yes," then the process continues to Block 620. If check is "No," then the process returns to Block 616 to continue the process.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The invention claimed is:

1. A control arrangement for controlling a position of an adjustable transfer device of a harvesting machine having a crop receiving header, a crop processing unit for processing crop received from the header, and the adjustable transfer device for unloading processed crop onto a container of a transport vehicle located to a rear end of the harvesting machine, the control arrangement comprising:
   an optical image capture device mounted on the adjustable transfer,
      wherein the optical image capture device includes a field of view including the container positioned at the rear end of the harvesting machine,
      wherein the optical image capture device generates image data;
   an image processing system connected to the optical image capture device,
      wherein the image processing system generates an image signal based on the image data, the image signal comprising container position data
   at least one sensor connected to the adjustable transfer device for sensing a position of the adjustable transfer device, wherein the at least one sensor generates a position signal;
   an electronic control unit connected to the image processing system, the electronic control unit comprising a processor and executable instructions stored on memory,
      wherein the electronic control unit receives the image signal and the position signal;
   at least one actuator connected to the adjustable transfer device and to the electronic control unit for adjusting the position of the adjustable transfer device based on an output from the electronic control unit;
   a display unit connected to the electronic control unit; and
   a user interface connected to the electronic control unit;
   wherein the processor of the electronic control unit executes the instructions to:
   identify the container in the image signal and a predetermined location on the container;
   calculate a point of incidence based on the sensor signal and the container position data;
   display an image of the container captured by the optical capture device overlaid with a symbol on the display unit,
      wherein the symbol represents the calculated point of incidence;
   receive adjustment inputs from the user interface for adjusting the position of the at least one actuator to adjust the adjustable transfer device, and update a position of the symbol in the image on the display unit according to an altered position of the at least one actuator if the symbol is not in an accurate position;
   receive a confirmation input from the user interface indicating that the symbol in the image on the display is in an appropriate position with respect to the displayed image of the container in order to fill the container with crop if the symbol is aligned with the container;
   derive at least one feature in the image representing the container; and
   track the container based on the at least one feature and control the at least one actuator accordingly to fill the container with crop by adjusting the adjustable transfer device relative to changes in position of the at least one feature.

2. The control arrangement according to claim 1, wherein the processor further executes instructions to receive a container search command input from the user interface.

3. The control arrangement according to claim 1, wherein the processor executes additional instructions to perform a function when the sensor signal indicates that the adjustable transfer device is in a rear unloading position.

4. The control arrangement according to claim 1, wherein the processor executes additional instructions to display the image of the container based upon the output signal of the image processing system.

5. The control arrangement according to claim 4, wherein the processor executes additional instructions to indicate in the displayed image of the container when at least one feature of the container was detected in the image from the optical image capture device.

6. The control arrangement according to claim 1, wherein the at least one actuator is operable to adjust at least one of a rotation angle, a tilt angle and a flap angle of the adjustable transfer device.

7. The control arrangement according to claim 1, wherein the optical image capture device is a stereo-camera.

8. The control arrangement according to claim 1, wherein the electronic control unit is further connected to (i) a position-determination device on the harvesting machine to provide real-time position coordinates of the harvesting machine and (ii) a receiver for receiving position signals from a position-determining device on the transport vehicle to provide real-time position coordinates of the transport vehicle, wherein the processor executes additional instructions to:
   receive the real-time position coordinates of the harvesting machine;
   receive the real-time position coordinates of the transport vehicle;
   calculate a relative position of the transport vehicle and the harvesting machine based on the real-time position coordinates of the harvesting machine and the real-time position coordinates of the transport vehicle; and
   control the at least one actuator to fill the container with crop by adjusting the adjustable transfer device relative to changes in the relative position with subsequent real-time position coordinates of the harvesting machine and subsequent real-time position coordinates of the transport vehicle.

9. The control arrangement according to claim 1, wherein the predetermined location is a front edge.

10. The control arrangement according to claim 1, wherein the predetermined location is an upper lateral edge.

11. The control arrangement according to claim 1, wherein the predetermined location is a side opening.

12. The control arrangement according to claim 1, wherein the predetermined location is a side opening.

13. The control arrangement according to claim 1, wherein the predetermined location is an expected point of incidence of crop flow into the container.

* * * * *